United States Patent
Hong et al.

(10) Patent No.: US 11,258,146 B2
(45) Date of Patent: Feb. 22, 2022

(54) BATTERY CELL HAVING OVERCHARGE PREVENTION MEMBER

(71) Applicant: LG Chem, Ltd., Seoul (KR)

(72) Inventors: Chul Gi Hong, Seoul (KR); Dong Kyu Kim, Daejeon (KR)

(73) Assignee: LG Energy Solution, Ltd.

( * ) Notice: Subject to any disclaimer, the term of this patent is extended or adjusted under 35 U.S.C. 154(b) by 101 days.

(21) Appl. No.: 16/627,022

(22) PCT Filed: Jan. 11, 2018

(86) PCT No.: PCT/KR2018/000529
§ 371 (c)(1),
(2) Date: Dec. 27, 2019

(87) PCT Pub. No.: WO2019/004545
PCT Pub. Date: Jan. 3, 2019

(65) Prior Publication Data
US 2020/0119329 A1 Apr. 16, 2020

(30) Foreign Application Priority Data
Jun. 29, 2017 (KR) .................. 10-2017-0082668

(51) Int. Cl.
*H01M 50/578* (2021.01)
*H01M 50/172* (2021.01)

(52) U.S. Cl.
CPC ....... *H01M 50/578* (2021.01); *H01M 50/172* (2021.01); *H01M 2200/20* (2013.01)

(58) Field of Classification Search
CPC ...... H01M 2/02; H01M 2/30; H01M 2220/20; H01M 2220/10; H01M 50/10; H01M 50/116; H01M 50/172; H01M 50/30
See application file for complete search history.

(56) References Cited

U.S. PATENT DOCUMENTS

| 5,352,547 A | 10/1994 | Kita et al. |
| 7,602,146 B2 | 10/2009 | Carrier et al. |
| 2013/0075242 A1 | 3/2013 | Lim |
| 2015/0072185 A1 | 3/2015 | Cho et al. |
| 2015/0171480 A1 | 6/2015 | Seo et al. |
| 2016/0036009 A1 | 2/2016 | Cho et al. |
| 2016/0149201 A1 | 5/2016 | Min et al. |

(Continued)

FOREIGN PATENT DOCUMENTS

| CN | 102044655 A | 5/2011 |
| CN | 103022579 A | 4/2013 |

(Continued)

OTHER PUBLICATIONS

International Search Report for International Patent Application No. PCT/KR2018/000529, dated Apr. 19, 2018, 7 pages.

(Continued)

*Primary Examiner* — Maria Laios
*Assistant Examiner* — Bartholomew A Hornsby
(74) *Attorney, Agent, or Firm* — Lerner, David, Littenberg, Krumholz & Mentlik, LLP

(57) ABSTRACT

The present invention relates to a battery cell having an overcharge prevention member, and more particularly, to a battery cell including a protective member for preventing explosion due to the pressure caused by various factors inside the battery.

8 Claims, 9 Drawing Sheets

(56) References Cited

U.S. PATENT DOCUMENTS

2017/0110711 A1     4/2017    Ahn et al.
2017/0117515 A1     4/2017    Ahn et al.

FOREIGN PATENT DOCUMENTS

| | | | |
|---|---|---|---|
| CN | 104603985 A | | 5/2015 |
| CN | 104733685 A | | 6/2015 |
| CN | 104733686 A | | 6/2015 |
| CN | 106159183 A | | 11/2016 |
| CN | 106601976 A | | 4/2017 |
| EP | 589229 A1 | | 3/1994 |
| JP | 2003-168410 A | | 6/2003 |
| JP | 4132588 B2 | | 8/2008 |
| JP | 2011-249428 A | | 12/2011 |
| JP | 2011249428 A | * | 12/2011 |
| KR | 10-2005-0066654 A | | 6/2005 |
| KR | 10-1500229 B1 | | 3/2015 |
| KR | 10-1623110 B1 | | 5/2016 |
| KR | 10-2016-0147145 A | | 12/2016 |
| KR | 10-2017-0020996 A | | 2/2017 |
| KR | 10-2017-0021102 A | | 2/2017 |
| KR | 20170021102 A | * | 2/2017 |
| KR | 10-2017-0025158 A | | 3/2017 |

OTHER PUBLICATIONS

Extended European Search Report for European Patent Application No. 18824555.9, dated Oct. 16, 2019, 7 pages.
Chinese Search Report for Application No. 201880020256.5 dated Aug. 30, 2021, 3 pages.

\* cited by examiner

BATTERY CELL HAVING OVERCHARGE PREVENTION MEMBER

CROSS-REFERENCES TO RELATED APPLICATIONS

This application is a U.S. national phase application, pursuant to 35 U.S.C. § 371, of PCT/KR2018/000529, filed Jan. 11, 2018, designating the United States, which claims priority to Korean Application No. 10-2017-0082668, filed Jun. 29, 2017. The entire contents of the aforementioned patent applications are incorporated herein by this reference.

TECHNICAL FIELD

The present invention relates to a battery cell having an overcharge prevention member, and more particularly, to a battery cell including a protective member for preventing explosion due to the pressure caused by various factors inside the battery.

BACKGROUND ART

The pouch-type lithium secondary battery, as a unit cell constituting a battery, has flexibility, a relatively free shape, a light weight, and excellent safety, and thus has increasing demand as a power source for mobile electronic apparatuses, such as smart phones, camcorders, and laptop computers.

In addition, the shape of the secondary battery is classified based on the shape of a battery case. When an electrode assembly is embedded in a cylindrical or rectangular metal can, the secondary battery is classified as a cylindrical battery or a rectangular battery, and when the electrode assembly is embedded in a pouch-type case of an aluminum laminate sheet, the secondary battery is classified as a pouch-type battery.

In addition, an electrode assembly embedded in a battery case has a structure in which a positive electrode, a negative electrode, and a separator inserted between the positive electrode and the negative electrode, and thus allows charge/discharge to be performed. The shape of the electrode assembly is classified as a jelly-roll type in which a positive electrode, a negative electrode, and a separator which have elongated sheet shapes and on which an electrode active material is applied, are sequentially stacked and wound and a stack type electrode assembly in which a plurality of positive electrodes, negative electrodes, and separators, which have predetermined sizes and on which an electrode active material is applied, are sequentially stacked.

Meanwhile, when an abnormal situation such as overcharge, over-discharge, or internal short occurs due to an extended storage in a high temperature environment, a failure of a charger or a front-side control circuit, or the like, the battery cell is swollen due to a side reaction of an electrolyte.

The swelling phenomenon increases the volume of the pouch exterior material and weakens the adhesion of a sealing region of the pouch exterior material, to cause an electrolyte to leak through the sealing region of the pouch exterior material, or the inside of the pouch exterior material is brought into a high-temperature and high-pressure environment due to an accelerated side reaction of the electrolyte, thereby burning or exploding the battery cell.

To prevent such problems, a battery cell including an explosion prevention member is provided, and a conventional battery cell in the related art will be described with reference to FIG. 1.

FIG. 1 is a detailed structural view of a battery cell including a conventional explosion preventions member.

Referring to FIG. 1, a conventional battery cell has a structure which includes an electrode assembly and a lead part having a groove, so that when a swelling phenomenon occurs, a groove-constituting part is destroyed, and the coupling of the battery cell is thereby released.

However, when a groove is provided to the lead part of the battery cell, the resistance of the lead part is increased compared to the case without the groove, and when the resistance of the lead part increases, there is a problem in that an output loss occurs accordingly.

Thus, a technique is demanded which prevents the output loss of a battery cell and explosion due to a pressure generated inside the battery cell.

RELATED ART DOCUMENT

Korean Patent Application Publication No. 2017-0021102

DISCLOSURE OF THE INVENTION

Technical Problem

The present invention provides a battery cell which prevents explosion caused by a pressure generated therein without affecting the output thereof.

Technical Solution

In accordance with an exemplary embodiment of the present invention, a battery cell includes an electrode assembly; a cell exterior material configured to accommodate the electrode assembly and including an upper exterior material and a lower exterior material; a lead part that extends between the upper exterior material and the lower exterior material from the electrode assembly and protrudes out of the cell exterior material; and a cutting part disposed above and below the lead part and configured to cut and disconnect the lead part when an overcharge occurs.

The cutting part (140) may include a first cutter part (141) disposed in the direction toward the electrode assembly, attached to the upper exterior material, and including a frame that accommodates a first cutting blade; a second cutter part (142) disposed on a side of the first cutter part in the direction opposite the electrode assembly, attached to the lower exterior material, and including a frame that accommodates a second cutting blade; and a third cutter part (143) disposed on a side of the second cutter part in the direction opposite the electrode assembly, attached to the upper exterior material, and including a frame that accommodates a third cutting blade, wherein when an overcharge occurs, the battery cell may expand, a distance between the upper exterior material and the lower exterior material may increase, and the lead part may be accordingly cut.

The first cutting blade of the first cutter part and the third cutting blade of the third cutter part may be respectively provided on lower end portions of the frames of the first cutter part and the third cutter part, and be disposed below the lead part when the cutting part is configured.

The second cutting blade of the second cutter part may be formed on an upper end portion of the second cutter part and disposed above the lead part when the cutting part is configured.

The cutting blades of the first cutter part, the second cutter part, and the third cutter part may be respectively provided in shapes obliquely inclined from one side to the other side.

The cutting blades of the first cutter part, the second cutter part, and the third cutter part may be disposed to have respective accommodating space in which the lead part is disposed.

The accommodating space may be determined based on a value of a pressure generated when an overcharge occurs.

In accordance with another exemplary embodiment, a method for manufacturing a battery cell that includes a cutting part for protecting the battery cell from an internal pressure generated during an overcharge includes an electrode assembly preparation process in which an electrode assembly is prepared through an electrode process; a cell exterior material formation process in which the electrode assembly prepared in the electrode assembly preparation process is accommodated in a cell exterior material having the cutting part; and a cell assembly completing process in which an electrolyte is injected into the cell exterior material formed in the cell exterior material formation process, and the cell exterior material is sealed.

The cell exterior material formation process may include a cutting part attachment process in which a first cutter part, a second cutter part, and a third cutter part are attached to the cell exterior material; a position adjustment process in which positions of the first cutter part, the second cutter part, and the third cutter part, which are attached in the cutting part attachment process, are adjusted; and a lead part positioning process in which a lead part connected to the electrode assembly is disposed in an accommodating space generated by adjusting the positions in the position adjustment process.

Advantageous Effects

A battery cell having an overcharge prevention member in accordance with exemplary embodiments is provided with a cutting part that cuts and disconnects a lead part, and thereby capable of simply performing a battery cell protection without an additional control, and the cutting part is provided separate from the lead part, and thus, the function of the lead part is not affected.

MODE FOR CARRYING OUT THE INVENTION

Hereinafter, with reference to the features disclosed in the accompanying drawings, exemplary embodiments will be described in detail. However, the present invention is not restricted or limited by the exemplary embodiments. Rather, the embodiments are provided so that the disclosure of the present invention is thorough and complete and fully conveys the scope of the present invention to those skilled in the art.

Although the terms such as "first" and "second" are used herein to describe various elements, these elements should not be limited by these terms. The terms are only used to distinguish one component from other components. For example, without departing from the scope of the present invention, a first component may be referred to as a second component, and similarly, the second component may also be referred to as the first component. In the following description, the technical terms are used only for explaining a specific exemplary embodiment while not limiting the present invention. The terms of a singular form may include plural forms unless referred to the contrary.

Terms used in the present invention is selected as general terms as widely used as possible while considering functions in the present invention, but these may be changed according to intent of a person skilled in the art, a precedent, an advent of new technique, or the like. In addition, in a specific case, there are terms arbitrarily selected by applicants, and in this case, the meaning of the terms will be described in detail in the corresponding description part of the present invention. Accordingly, the terms used in the present invention should be defined on the basis of the meanings the terms have and the contents of the entirety of the present invention rather than defined by simple nomenclature of the terms.

Embodiment 1

Hereinafter a battery cell in accordance with an exemplary embodiment of the present invention will be described.

When a swelling phenomenon occurs inside the battery cell due to a pressure equal to or higher than a predetermined pressure, a cutting part for cutting and disconnecting a lead part of the battery cell is provided to the battery cell in accordance with an exemplary embodiment of the present invention, and thus, explosion of the battery cell may be prevented more simply without a complicated operational configuration.

Figure 1:
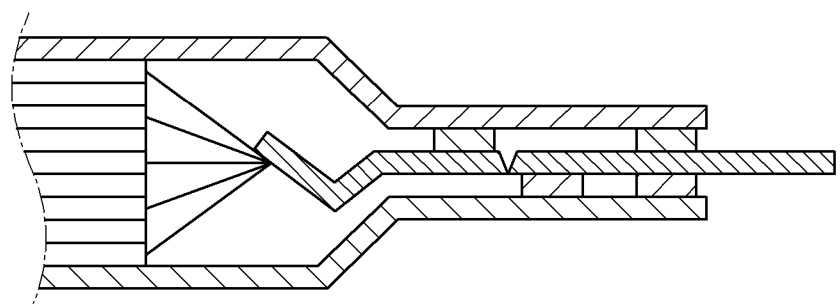
FIG. 1 is a detailed structural view of a battery cell including a conventional explosion preventions member.
Figure 2:
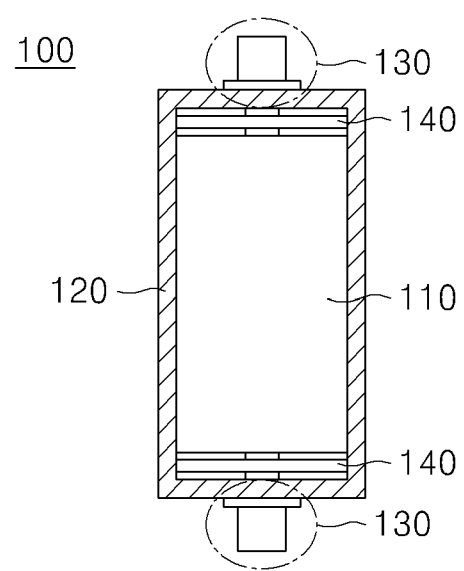
FIG. 2 is a structural view of an upper surface of a battery cell in accordance with an exemplary embodiment of the present invention.

FIG. 2 is a structural view of an upper surface of a battery cell in accordance with an exemplary embodiment of the present invention.

Figure 3:
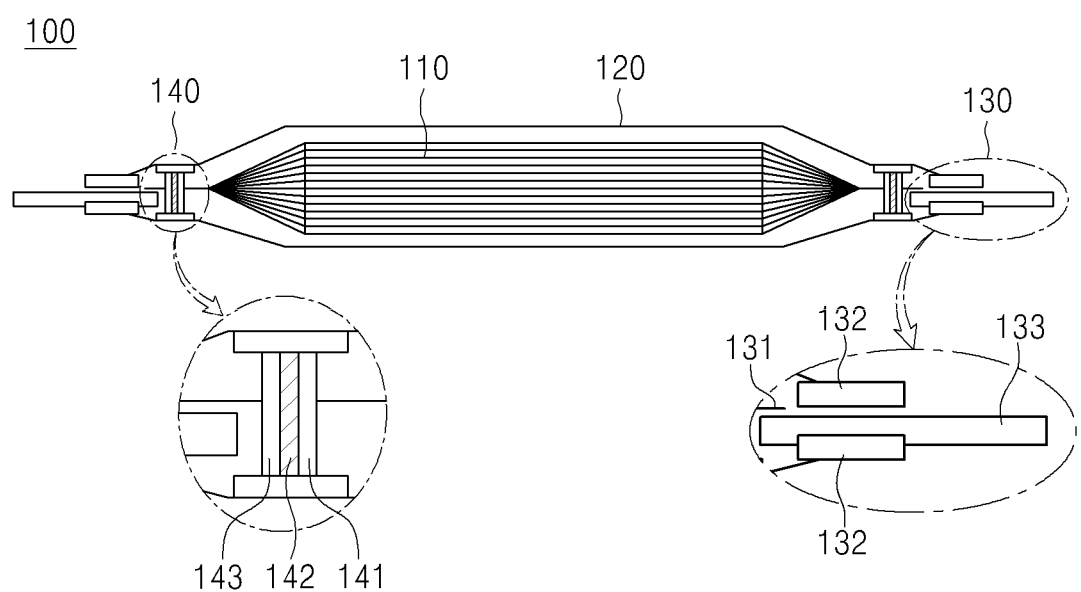
FIG. 3 is a structural view of a side surface of a battery cell in accordance with an exemplary embodiment of the present invention.

FIG. 3 is a structural view of a side surface of a battery cell in accordance with an exemplary embodiment of the present invention.

Referring to FIGS. 2 and 3, a battery cell 100 in accordance with an exemplary embodiment of the present invention includes an electrode assembly 110; a cell exterior material 120 that accommodates the electrode assembly 110 and includes an upper exterior material and a lower exterior material; a lead part 130 that extends between the upper exterior material and the lower exterior material from the electrode assembly 110 and protrudes out of the cell exterior material 120; and a cutting part 140 that is disposed on upper and lower sides of the lead part 130 to cut and disconnect the lead part when an overcharge occurs.

In addition, the battery cell is configured to include an electrolyte, and the electrolyte contacts the electrode assembly during repeated charge/discharge of the battery cell and serves as a medium for transferring lithium ions to a negative electrode or the positive electrode of the electrode assembly.

A configuration of the battery cell 100 will be described below in more detail.

The electrode assembly 110 has a structure in which the positive electrode, the negative electrode, and a separator inserted between the positive electrode and the negative electrode, and may be configured in a jelly-roll type in which a positive electrode, a separator, and a negative electrode which have elongated sheet shapes and on which electrode active material is applied are sequentially stacked and wound, and a stack type in which a plurality of positive electrodes, separators, and negative electrodes which have predetermined sizes and on which electrode active material is applied are sequentially stacked. The negative electrode active material is composed of carbon-based compounds, and the positive electrode active material is composed of lithium-based metal compounds.

In addition, the cell exterior material 120 is formed as a metal thin layer and a polymer thin layer that sandwiches the metal thin layer. The cell exterior material 120 includes an upper exterior material and a lower exterior material, accommodates the battery assembly 110 and an electrolyte, and is sealed by a thermal fusion with a sealing member along a peripheral sealing region.

The sealing member surrounds and fuses the lead part 130 in the sealing region of the cell exterior material that intersects the lead part 130 and thus improves the sealing characteristic of a pouch exterior material.

In addition, an attachment part having a predetermined width may be provided in the cell exterior material 120 to allow the cutting part 140 to be disposed, which allows the cutting part 140 to be guaranteed to have a predetermined space.

The lead part 130 is a component that extends between the upper exterior material and the lower exterior material from the electrode assembly 110 and protrudes out of the cell exterior material 120, and includes a tap 131 of the electrode assembly, a sealing member 132, and a battery cell lead 133.

The tap 131 of the electrode assembly is a component which is connected to the electrode assembly inside the electrode assembly 110, configured as one tap when the configuration of the electrode assembly is the jelly-roll type, and as a single form by overlapping a plurality of taps when the configuration of the electrode assembly is the stack type.

In addition, the sealing member 132 is configured from a lower film and an upper film which are composed of a resin composition, such as polyolefin or modified polyolefin, having a thermal fusion property.

Accordingly, the sealing member 132 surrounds a battery cell lead 133 with the upper film and the lower film, or joined to the battery cell lead by an adhesive or thermal fusion.

In particular, since the sealing member 132 and the battery cell lead 133 are tightly joined with each other, moisture penetration from the outside through the joined interface of the cell exterior material 120 may effectively be prevented.

In addition, the battery cell lead 133 is composed of metallic material, and the two battery cell leads are positioned in one direction or in both directions from the electrode assembly 110 and provide an electrical path for charge/discharge current.

Further, the battery cell leads 133 are allowed to be joined and electrically connected to taps 131 of the electrode assembly 131.

Meanwhile, the cutting part 140 will be described in more detail with reference to FIG. 4.

Figure 4:
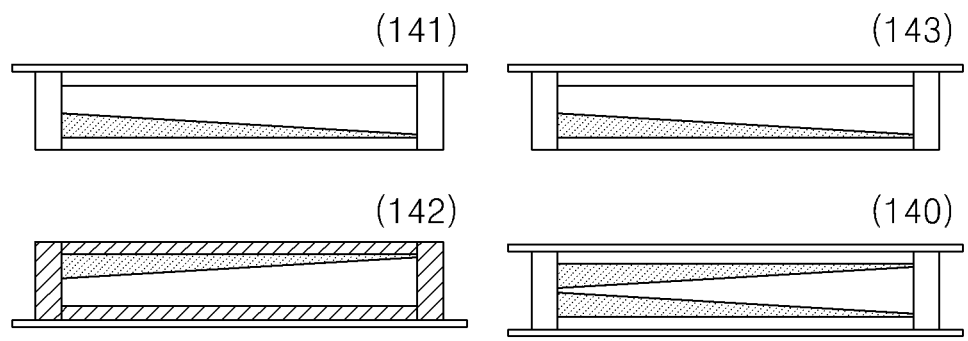
FIG. 4 is a structural view of a cutting part in a battery cell in accordance with an exemplary embodiment of the present invention.

FIG. 4 is a structural view of a cutting part in a battery cell in accordance with an exemplary embodiment of the present invention.

Referring to FIG. 4, the cutting part 140 is a component, which is disposed above and below the lead part to cut and disconnect the lead part when an overcharge occurs, and includes a first cutter part 141, a second cutter part 142, and a third cutter part 143 which are formed as a rectangular frame.

The first cutter part 141 is disposed in the direction toward the electrode assembly and includes a frame attached to the upper exterior material and configured to accommodate a first cutting blade.

In addition, the second cutter part 142 is disposed at the first cutter part 141 in the direction opposite to the electrode assembly and includes a frame which is attached to the lower exterior material and accommodates a second cutting blade.

Further, the third cutter part 143 is disposed at the second cutter part 142 in the direction opposite to the electrode assembly and includes a frame which is attached to the upper exterior material and accommodates a third cutting blade.

The first cutter part 141, the second cutter part 142, and the third cutter part 143 may be further provided with fine recesses-and-protrusions on respective frames to be disposed close to each other.

In addition, the first cutting blade of the first cutter part and the third cutting blade of the third cutter part may respectively be provided on lower end portions of the frames of the first cutter part and the third cutter part, and be disposed on a lower portion of the lead part when the cutter part is configured.

Further, the second cutting blade of the second cutter part 142 may be formed on an upper end portion of the second cutter part and disposed on an upper portion of the lead part when the cutting part is configured.

The attached positions of the first cutter part 141 and the third cutter part 143, and the position of the second cutter part may be varied, and the positions of the cutting blades may also be changed and thus be attached to the cell exterior material.

In addition, each of the cutting blades of the first cutter part 141, the second cutter part 142, and the third cutter part 143 is provided in a shape inclined from one side to the other side to allow a space for accommodating the lead part 130 to be ensured.

When the lead part 130 is disposed, portions in which the first, second, and third cutting blades meet form a predetermined accommodating space, and the accommodating space is determined based on a value of pressure generated when the abnormal condition such as an overcharge occurs. This is to prevent the breakage of the lead part 130 due to a slight swelling in a general reaction.

In addition, the cutting blade used in the cutting part 140 will be described in detail with reference to FIG. 5.

Figure 5:
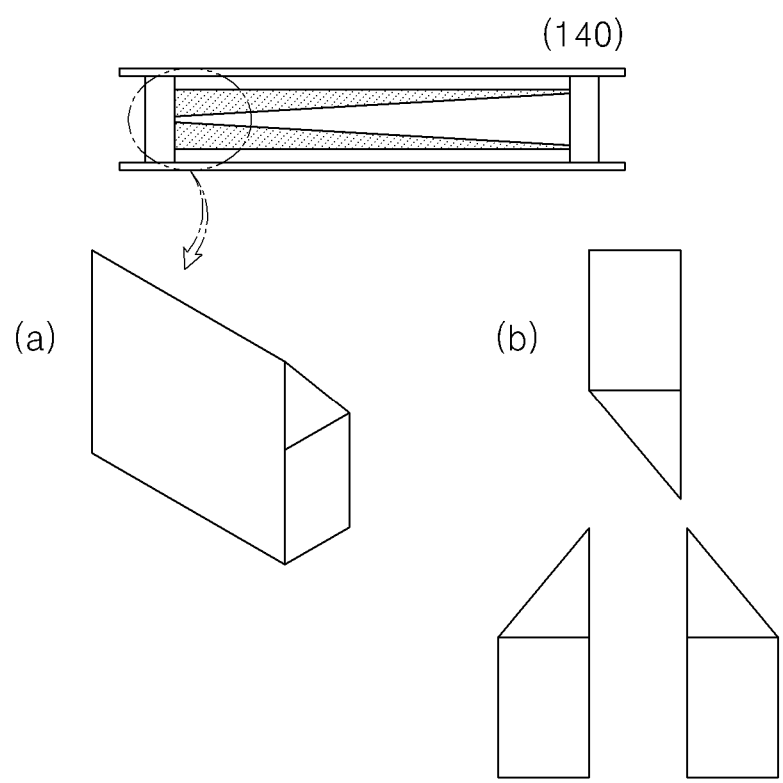
FIG. 5 is a structural view of a cutting blade of a cutting part in a battery cell in accordance with an exemplary embodiment of the present invention.

FIG. 5 is a structural view of a cutting blade of a cutting part in a battery cell in accordance with an exemplary embodiment of the present invention.

Referring to FIG. 5, (a) of FIG. 5 illustrates an expanded view of one cutting blade, and (b) of FIG. 5 illustrates a cutting blade of the cutting part when viewed in a side view. In particular, the cutting blades of the cutting part 140 have a shape in which only the end thereof is sharp and pointed, and other portions thereof are generally rectangular.

In addition, the cutting blade is formed of a ceramic-based material and does not affect chemical reactions activated in the battery during charge/discharge.

Further, the cutting blade of each cutter part is formed as illustrated in (b) of FIG. 5, and thus, the lead part may be easily cut.

Meanwhile, the operating mechanism of the cutting part 140 will be described in more detail with reference to FIG. 6.

Figure 6:
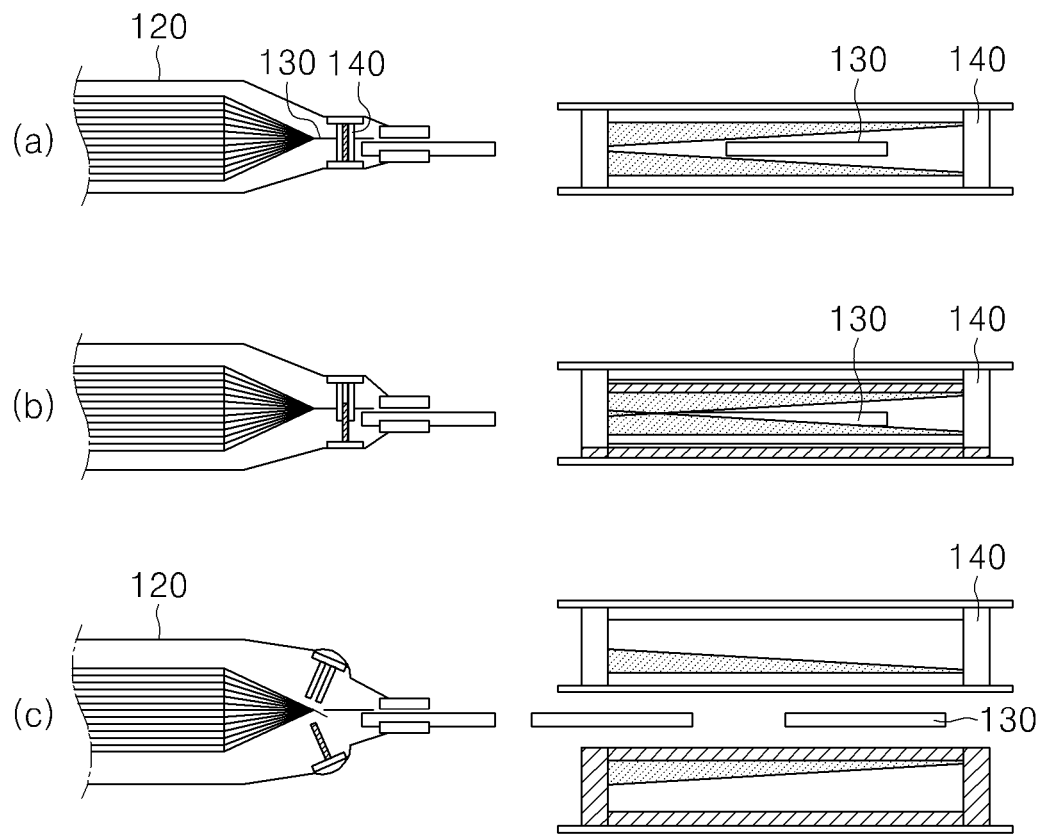
FIG. 6 is a schematic view for describing an operating mechanism of a cutting part due to a pressure increasing in a battery cell in accordance with an exemplary embodiment of the present invention.

FIG. 6 is a schematic view for describing an operating mechanism of a cutting part due to an increasing pressure in a battery cell in accordance with an exemplary embodiment of the present invention.

The left side of FIG. 6 illustrates structural views of side surface parts of the battery cell 100, and the right side of FIG. 6 illustrates structural views of an electrode assembly 110 and a cutting part 140 when viewed in the direction from the electrode assembly.

Referring to FIG. 6, first, (a) of FIG. 6 is a view of a lead part 130 and a cutting part 140 in a normal state. In the normal state, as shown in the drawings on the right, the lead part 130 and the cutting part 140 are provided in a shape having a predetermined accommodating space in which the cutting blade of the cutting part 140 does not contact the lead part 130.

When gas is quickly generated inside the battery cell due to an overcharge or other abnormal states, the cell exterior material 120 is also swollen due to the gas generated inside the battery cell, and consequently, the cutting part 140 is also slowly dismantled, and the lead part 130 also contacts the cutting part 140 as shown in (b) of FIG. 6.

Subsequently, as illustrated in (c) of FIG. 6, when the gas is further generated, as the cell exterior material 120 further expands, the cutting part 140 is completely dismantled and the lead part 130 is disconnected.

Figure 7:
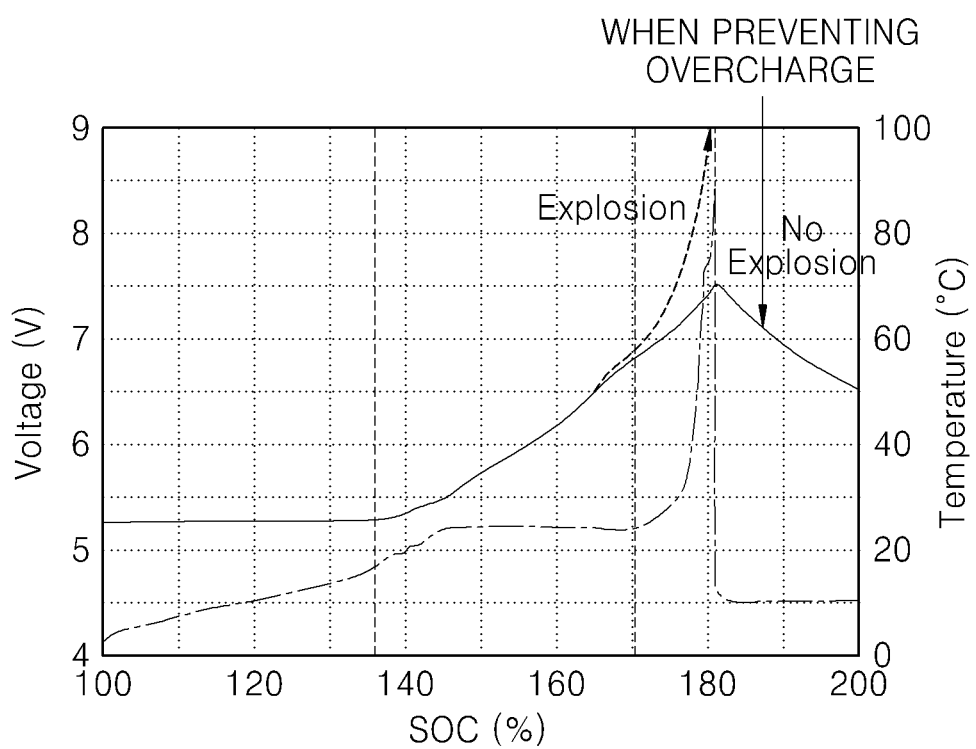
FIG. 7 is a graph comparing a battery cell in accordance with an exemplary embodiment of the present invention and a conventional battery cell without an overcharge prevention member.

In addition, the effect due to the action of the cutting part 140 may be seen in detail in FIG. 7. FIG. 7 is a graph that compares a battery cell in accordance with an exemplary embodiment of the present invention and a conventional battery cell without an overcharge prevention member. The solid line represents voltages, and the wide-width dotted line represents temperatures.

Referring to FIG. 7, when an overcharge occurs in a battery cell, the voltage of the battery cell is quickly raised from a predetermined range, and the temperature is also abruptly raised, and thus, an explosion occurs in the conventional battery cell without an overcharge prevention member.

However, in a battery cell provided with an overcharge prevention member, the cutting part 140 cuts the lead part 130 due to a property, in which the temperature is slowly raised and the internal pressure is also increased, and thus, the explosion of the battery cell may be prevented.

Embodiment 2

Next, a method for manufacturing a battery cell in accordance with an exemplary embodiment of the present invention will be described.

In a method for manufacturing a battery cell in accordance with an exemplary embodiment, the method for manufacturing a battery cell including an overcharge prevention member in which a cutting part is attached to a cell exterior material, and a lead part of an electrode assembly is disposed at a suitable position of the attached cutting part, prevents explosion due to an internal pressure generated when an overcharge occurs while not affecting charge/discharge.

Figure 8:
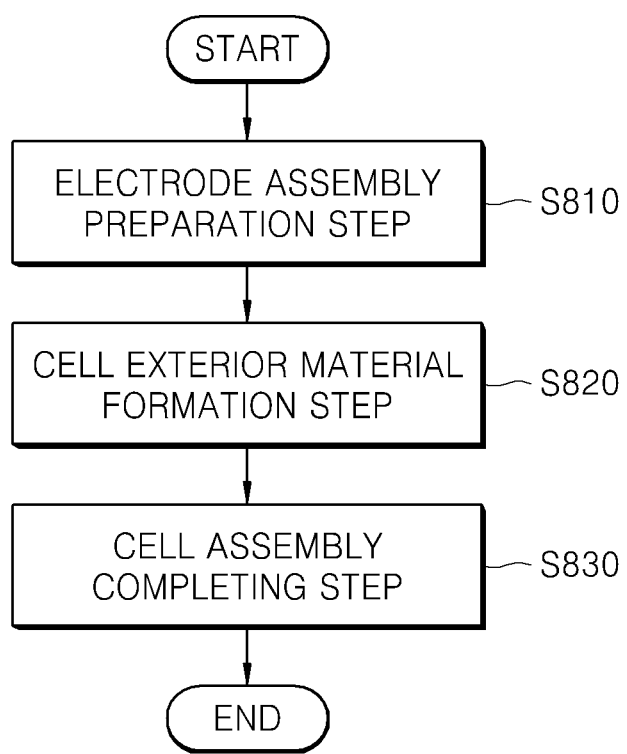
FIG. 8 is a flow chart of a method for manufacturing a battery cell in accordance with an exemplary embodiment of the present invention.

FIG. 8 is a flow chart of a method for manufacturing a battery cell in accordance with an exemplary embodiment of the present invention.

Referring to FIG. 8, in a method for manufacturing a battery cell in accordance with an exemplary embodiment of the present invention, firstly, an electrode assembly is prepared through an electrode process (electrode assembly preparation step: S810), and the prepared electrode assembly is accommodated in a cell exterior material provided with a cutting part (cell exterior material formation step: S820).

Subsequently, an electrolyte is injected into the cell exterior material, and the cell exterior material is sealed (cell assembly completing step: S830).

The process of the method for manufacturing a battery cell corresponds to an assembly process among manufacturing processes, and a process for manufacturing a general battery cell is roughly divided into three processes such as electrode, assembly, and formation processes.

First, in the electrode process, materials are mixed with an appropriate ratio for manufacturing a positive electrode and a negative electrode; the positive electrode is coated with aluminum, and the negative electrode is coated with a copper foil; the resultant is pressed in a predetermined thickness through a roll press to be flat; and subsequently a slitting process is performed to cut the resultant to be matched with the electrode size.

In addition, the assembly process is a process in which a winding step of roundly winding the positive electrode, a separator, and a negative electrode in this order and a stacking step of repeatedly stacking the positive electrode, the separator, and the negative electrode are performed and packaged with a aluminum film wrapping material. Subsequently, an electrolyte is added, and the resultant is sealed to be a vacuum state. The assembly process is a process of the manufacturing method performed in the present invention.

In the final formation process, the battery cell is activated while repeating charge/discharge of the assembled battery cell, a degassing step of discharging the gas generated in the battery cell is performed during the activation, and subsequently, a final battery cell is completed.

In addition, each step of the method for manufacturing a battery cell will be described in more detail below.

The electrode assembly preparation step (S810) is a step of preparing the electrode assembly through the electrode process, and the electrode assembly is prepared through the method described about the electrode process.

In addition, the cell exterior material formation step (S820) is a step of accommodating the electrode assembly prepared in the electrode assembly preparation step into a cell exterior material provided with the cutting part, and will be described in more detail with reference to FIG. 9.

Figure 9:
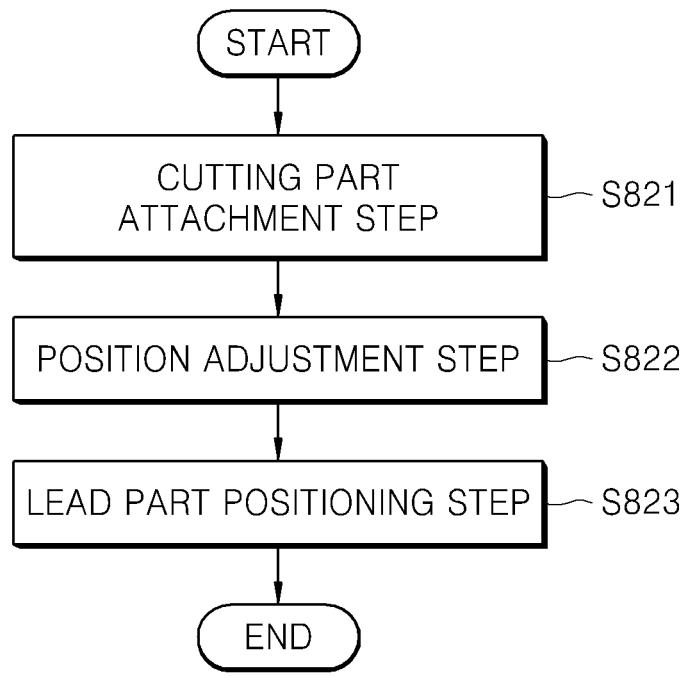
FIG. 9 is a flow chart of a cell exterior material formation step among a method for manufacturing a battery cell in accordance with an exemplary embodiment of the present invention.

FIG. 9 is a flow chart of a cell exterior material formation step in a method for manufacturing a battery cell in accordance with an exemplary embodiment of the present invention.

Referring to FIG. 9, in the cell exterior material formation step (S820), a first cutter part, a second cutter part, and a third cutter part are attached to the cell exterior material (cutting part attachment step: S821), and the positions of the first cutter part, the second cutter part, and the third cutter part which have been attached are adjusted (position adjustment step: S822).

Subsequently, the lead part connected to the electrode assembly is disposed in an accommodating space generated by adjusting the positions of the first cutter part, the second cutter part, and the third cutter part (lead part positioning step: S823).

The cutting part attachment step (S821) is a step of attaching the first cutter part, the second cutter part, and the third cutter part to the cell exterior material, and is subjected to a premise that the cell exterior material, in which an attachment part for attaching the cutting part has been already formed, is prepared.

Accordingly, the first cutter part is firstly attached to an upper exterior material of the cell exterior material in the direction of the electrode assembly, and subsequently, the second cutter part is attached to a lower exterior material of the cell exterior material in the direction opposite to the electrode assembly of the first cutter part.

Finally, the third cutter part is attached to the upper exterior material of the cell exterior material in the direction opposite to the electrode assembly of the second cutter part.

In addition, the position adjustment step (S822) is a step of adjusting the first cutter part, the second cutter part, and the third cutter part which are attached to the cell exterior material, and since each cutter part is attached to only one side of the cell exterior material, the position of each cutter part may be formed at an incorrect position.

Moreover, as the cutting blade of each cutter part is adjusted, a predetermined accommodating space in which the lead part may be disposed without damage is ensured.

In addition, the lead part positioning step (S823) is a step for positioning the lead part connected to the electrode assembly in the accommodating space generated by adjusting the positions of the first cutter part, the second cutter part, and the third cutter part, and is subjected to a premise that a step of joining the lead part to the electrode assembly has already been performed prior to this step.

In addition, the cell assembly completing step (S830) is a step for injecting an electrolyte into the cell exterior material formed in the cell exterior material formation step and sealing the cell exterior material. In this step, the electrolyte may be injected after the thermal fusion of the cell exterior material except a portion thereof, or the entire surface of the cell exterior material is thermally fused, a portion of injection ports is formed, the electrolyte is injected thereinto, and the cell exterior material may be fused again.

In addition, through the formation process, a step is performed, in which the battery cell is activated while the battery cell assembled in the above steps is repeatedly charged/discharged, and the gas generated in the battery cell during the activation is discharged, and in this step, a space between the lead part and the cutting part may be ensured by a predetermined range or more to prevent the cutting part from operating in this step.

The technical idea of the present invention has been specifically described with respect to the above embodiments, but it should be noted that the foregoing embodiments are provided only for illustration while not limiting the present invention. In addition, a person with an ordinary skill in the technical field that the present invention belongs to may carry out various embodiments within the scope of claims set forth herein.

DESCRIPTION OF SYMBOLS

100: Battery cell
110: Electrode assembly
120: Cell exterior material
130: Lead part
131: Tap of electrode assembly
132: Sealing member
133: Battery cell lead
140: Cutting part
141: First cutter part
142: Second cutter part
143: Third cutter part

What is claimed is:

1. A battery cell comprising:
an electrode assembly;
a cell exterior material configured to accommodate the electrode assembly and comprising an upper exterior material and a lower exterior material;
a lead part that extends between the upper exterior material and the lower exterior material from the electrode assembly and protrudes out of the cell exterior material; and
a cutting part disposed above the lead part and below the lead part and configured to cut and disconnect the lead part when overcharge occurs,
wherein the cutting part comprises:
a first cutter part disposed in the direction toward the electrode assembly, attached to the upper exterior material, and comprising a frame that accommodates a first cutting blade;
a second cutter part disposed on a side of the first cutter part in the direction opposite the electrode assembly, attached to the lower exterior material, and comprising a frame that accommodates a second cutting blade; and
a third cutter part disposed on a side of the second cutter part in the direction opposite the electrode assembly, attached to the upper exterior material, and comprising a frame that accommodates a third cutting blade,
wherein, when overcharge occurs, the battery cell expands, a distance between the upper exterior material and the lower exterior material increases, and the lead part is thereby cut.

2. The battery cell of claim 1, wherein the first cutting blade of the first cutter part and the third cutting blade of the third cutter part are respectively provided on lower end portions of the frames of the first cutter part and the third cutter part, and disposed below the lead part when the cutting part is configured.

3. The battery cell of claim 1, wherein the second cutting blade of the second cutter part is formed on an upper end portion of the second cutter part and disposed above the lead part when the cutting part is configured.

4. The battery cell of claim 1, wherein the cutting blades of the first cutter part, the second cutter part, and the third cutter part are respectively provided in shapes obliquely inclined from one side to the other side.

5. The battery cell of claim 1, wherein the cutting blades of the first cutter part, the second cutter part, and the third cutter part are disposed to have respective accommodating space in which the lead part is disposed.

6. The battery cell of claim 5, wherein the accommodating space is determined based on a value of a pressure generated when overcharge occurs.

7. A method for manufacturing a battery cell which comprises a cutting part for protecting the battery cell from an internal pressure generated during an overcharge, the method comprising:
an electrode assembly preparation process in which an electrode assembly is prepared through an electrode process;

a cell exterior material formation process in which the electrode assembly prepared in the electrode assembly preparation process is accommodated in a cell exterior material having the cutting part; and a cell assembly completing process in which an electrolyte is injected into the cell exterior material formed in the cell exterior material formation process and the cell exterior material is sealed, wherein the cell exterior material formation process comprises:

a cutting part attachment process in which a first cutter part, a second cutter part, and a third cutter part are attached to the cell exterior material; and a lead part positioning process in which a lead part connected to the electrode assembly is disposed in an accommodating space formed by positions of the first cutter part, the second cutter part, and the third cutter part generated by adjusting the positions in the position adjustment process.

8. The method of claim 7, further comprising:

a position adjustment process in which positions of the first cutter part, the second cutter part, and the third cutter part, which are attached in the cutting part attachment process, are adjusted; and wherein the accommodating space is generated by adjusting the positions in the position adjustment process.

* * * * *